United States Patent [19]

Stewart

[11] Patent Number: 5,254,354

[45] Date of Patent: Oct. 19, 1993

[54] FOOD PACKAGE COMPRISED OF POLYMER WITH THERMALLY RESPONSIVE PERMEABILITY

[75] Inventor: Ray F. Stewart, Redwood City, Calif.

[73] Assignee: Landec Corporation, Menlo Park, Calif.

[21] Appl. No.: 885,915

[22] Filed: May 18, 1992

Related U.S. Application Data

[63] Continuation of Ser. No. 623,602, Dec. 7, 1990, abandoned.

[51] Int. Cl.⁵ .............................................. B65D 85/00
[52] U.S. Cl. ..................................... 426/106; 426/415; 426/418; 426/419; 428/35.4
[58] Field of Search ............... 426/415, 410, 419, 106, 426/125; 428/35.4, 36.6; 264/331.21, 331.22, 331.12, 331.19

[56] References Cited

U.S. PATENT DOCUMENTS

| | | |
|---|---|---|
| 2,611,709 | 9/1952 | Plagge . |
| 3,157,518 | 11/1964 | Battista . |
| 3,423,212 | 1/1969 | Purcell et al. .................... 426/415 |
| 3,450,543 | 6/1969 | Badran et al. ................... 426/415 |
| 3,507,667 | 4/1970 | Magnen .......................... 426/419 |
| 3,681,092 | 8/1972 | Titchenal et al. . |
| 3,706,410 | 12/1972 | Baker ............................. 206/67.2 |
| 4,015,033 | 3/1979 | Nield ............................. 264/564 |
| 4,079,152 | 3/1978 | Bedrosian et al. ............... 426/415 |
| 4,123,589 | 10/1978 | Korlatzki et al. ................ 426/105 |
| 4,136,203 | 1/1979 | Murphy et al. .................. 426/124 |
| 4,141,487 | 2/1979 | Faust et al. ..................... 229/43 |
| 4,276,340 | 6/1981 | de Leiris ......................... 426/415 |
| 4,299,719 | 11/1981 | Aoki et al. ...................... 426/541 |
| 4,322,465 | 3/1982 | Webster .......................... 428/194 |
| 4,485,133 | 11/1984 | Ohsuka et al. ................... 428/35 |
| 4,530,440 | 7/1985 | Leong ............................. 220/201 |
| 4,536,409 | 8/1985 | Farrel et al. ..................... 426/398 |
| 4,640,838 | 2/1987 | Isakson et al. ................... 426/107 |
| 4,657,610 | 4/1987 | Komatsu et al. ................. 426/124 |
| 4,737,389 | 4/1988 | Hartsing et al. .................. 426/127 |
| 4,759,444 | 7/1988 | Barmore .......................... 206/521.1 |
| 4,783,342 | 11/1988 | Polovina ......................... 427/4 |
| 4,830,855 | 5/1989 | Stewart ........................... 424/448 |
| 4,830,863 | 5/1988 | Jones .............................. 426/419 |
| 4,842,875 | 6/1989 | Anderson ........................ 426/415 |
| 4,856,650 | 4/1989 | Inoue .............................. 426/124 |
| 4,883,674 | 11/1989 | Fan ................................. 426/415 |
| 4,923,703 | 5/1990 | Antoon, Jr. ...................... 426/415 |
| 4,949,847 | 8/1990 | Nagata ............................ 426/415 |
| 4,956,209 | 9/1990 | Isaka et al. ...................... 426/106 |
| 4,959,516 | 9/1990 | Tighe et al. ...................... 426/243 |
| 4,960,600 | 10/1990 | Kester et al. ..................... 426/310 |
| 5,011,698 | 4/1991 | Antoon, Jr. et al. .............. 426/395 |

OTHER PUBLICATIONS

Relation Between Structure of Polymers and Their Dynamic Mechanical and Electrical Properties, Part I, Deutsch et al., Journal of Polymer Science, vol. XIII, pp. 565-582 (1954).

(List continued on next page.)

Primary Examiner—Steven Weinstein
Assistant Examiner—Anthony Weier
Attorney, Agent, or Firm—Jeffrey G. Sheldon

[57] ABSTRACT

Food may be packaged and preserved for extended periods using intelligent polymers formed into food containers which have specific and variable gas permeabilities. The polymers used in forming the food packages are intelligent in that they have permeabilities which may be radically and reversibly changed by relatively small changes in temperature. By using different types and formulations of polymers and various temperatures, it is possible to create an environment within the food package which adjusts to the respiration of the food so as to best preserve the color, quality and/or shelf life of the food. The polymers are side-chain crystallizable polymers designed and formulated so as to provide a material which is substantially impermeable to a gas such as oxygen, carbon dioxide or water vapor at a temperature below a given phase transition point and permeable to the same gas at a temperature above that point.

23 Claims, No Drawings

OTHER PUBLICATIONS

Linear thermoplastic polyurethane, Don Mitchell, British Plastics May 1967, pp. 105–109.

Water Vapor Permeability of an Edible, Fatty Acid, Bilayer Film, Kamper et al, J. Food Sci. 49(6):1482–85.

The Wiley Encyclopedia of Packaging Technology, John Wiley and Sons, 1986 pp. 48–53, 531–536.

Modified Atmosphere Packaging of Fresh Produce, Zagory et al, Food Tech. Sep. 1988, pp. 70–77.

Plate et al., *J. Polymer Sci.: Macromolecular Reviews* (1974)8:117–253.

Miyauchi et al., *J. Polymer Sci.: Polymer Chemistry Edition* (1981) 19:1871–1873.

Jordan, *J. Polymer Sci.: Polymer Chemistry Edition* (1972) 10:3347–3366.

Jordan et al., *J. Polymer Sci.: Part A-2* (1972) 10:1657–1679.

Jordan, *J. Polymer Sci.: Part A-1* (1971) 9:3367–3378.

Jordan et al., *J. Polymer Sci.: Part A-1* (1971) 9:3349–3365.

Jordan et al., *J. Polymer Sci.: Part A-1* (1971) 9:1835–1852.

Pittman et al., *J. Polymer Sci.: Part A-1* (1969) 7:3035–3066.

Greenberg et al., *J.A.C.S.* (1954) 76:6280–6285.

Overberger et al., *J.A.C.S.* (1953) 75:3326–3330.

Yokota et al., *Polymer Journal* (1985) 17(9):991–996.

Gonzalez de la Campa et al., *J. Polymer Sci.: Polymer Physics Edition* (1980) 18:2197–2207.

Magagnini et al., *Macromolecules* (1980) 13:12–15.

Wantanabe et al., *Macromolecules* (1985) 18(11):2141–2148.

Aharoni, *Macromolecules* (1979) 12(1):94–103.

Rabolt et al., *Macromolecules* (1986) 19(3):611–616.

Cameron et al., *Journal of Food Science* (1989) 54(6):1413–1421.

Chupov et al., *Polymer Science U.S.S.R.* (1979) 21:241–252.

Informational Brochure from W. R. Grace & Company, Cryovac Division, Duncan, S.C. 29334, 2 pages total.

McMullin, *California-Arizona Farm Press* (Saturday, Apr. 20, 1991) p. 25.

Lioutas, Theodore S., *Food Technology* (Sep. 1988) pp. 78–86.

FOOD PACKAGE COMPRISED OF POLYMER WITH THERMALLY RESPONSIVE PERMEABILITY

CROSS REFERENCE

This application is a continuation of U.S. application Ser. No. 07/623,602, filed Dec. 7, 1990, now abandoned which application is incorporated herein by reference and to which application we claim priority under 35 USC § 120.

FIELD OF THE INVENTION

The present invention relates generally to the field of packaging. More specifically, it relates to containers for food, cut flowers and the like, which containers are comprised of polymeric materials whose permeability is changed by changes in temperature.

BACKGROUND OF THE INVENTION

Since mankind first collected more than it was possible to immediately consume, there has been a need for food containers to aid in preservation. In more modern times, food, flowers and other such materials have been stored in air-tight containers in that oxygen and moisture are often primary factors in food deterioration. Although the use of airtight containers can aid in slowing deterioration, foods and other related biological products are dynamically changing biological systems which are no longer growing but rather are deteriorating. Accordingly, when such a biological material is enclosed in a particular container, the environment is only maintained for a given period of time and that environment will change depending on the type of food and its original condition, temperature, environment, and other factors.

The storage of foods and other related biological materials can be broadly separated into two categories. In the first category there is included products which are not undergoing significant chemical/biological change. In the second category are materials which are undergoing significant chemical/biological changes. The changes relate to active metabolism and/or respiration of the materials. Examples of materials which are not undergoing significant change include cooked and canned foods, frozen foods and the like. It is generally desirable to keep such products in an oxygen free environment and to eliminate gas exchanges as much as possible to keep the products in acceptable condition. Products which are undergoing substantial change include products such as potatoes, strawberries, lettuce, meat, poultry, dairy products and the like. Such products are actively metabolizing and/or undergoing respiration and thereby require the benefit of an exchange of atmospheric gases including, but not limited to, carbon dioxide, oxygen, water vapor and other gases which may be given off by the materials such as various short chain hydrocarbons.

As an example of foods which could be sealed in an air-tight container and still deteriorate due to a change in environment, reference is made to fruits, which give off carbon dioxide during storage. A high concentration of carbon dioxide in the atmosphere in which fruits are stored causes a physiological breakdown of the fruit. To satisfactorily store fruit, it should be maintained at a relatively low temperature in an atmosphere of controlled carbon dioxide and oxygen concentration and the loss of moisture should be controlled within a given range.

The optimum storage conditions for any given biological material often varies between particular cultivars or varieties. Further, the optimum conditions for a given product may vary depending on the age, thermal past history and developmental stage of the material present within the container. Apples, for example, are advantageously stored at about 36° F. and pears are stored at about 30°-31° F. For apples, the carbon dioxide content of the air within the storage container is preferably about 5-10% and for pears a concentration of from 5-20% or even as high as 25% is satisfactory. The rate of oxygen consumption and carbon dioxide generation by a given fruit varies with the age of the fruit and the temperature at which it is stored. Accordingly, it is difficult to maintain constant conditions within an air-tight storage container. Freshly picked apples give off carbon dioxide much more rapidly than apples which are three to four weeks old. If packaged immediately after picking, the carbon dioxide content of the air in the storage container during the first several weeks will be much higher than if the apples were stored at a later time. For this reason, earlier storage techniques often postpone packing the apples in containers until after the initial period of several weeks in which the carbon dioxide rapidly evolved. Attempts at solving the problem of carbon dioxide buildup were discussed at least as early as 1952 within U.S. Pat. No. 2,611,709, issued Sep. 23, 1952, to Homer H. Plagge. The Plagge disclosure teaches the use of different types of rubber hydrochloric films which have varying permeabilities with respect to certain gasses such as carbon dioxide due to the use of films with different thicknesses and films of different plasticizer content.

When packaging a completely different type of food, such as fresh, red meat, the oxygen content must be controlled within a narrow range in order to allow the meat to maintain the desirable red color. Complete lack of oxygen results in fresh meat having an undesirable purplish-red coloration. It is therefore desirable to use a packaging material which is at least partially permeable to oxygen. However, long continued oxidation of the myoglobin and oxymyoglobin results in the formation of brown discoloration. An earlier attempt at regulating the meat coloration by controlling the oxygen content is disclosed within U.S. Pat. No. 3,681,092 issued Aug. 1, 1972, to Titchenal et al., which discloses a method of packaging meat which includes enclosing the meat in a oxygen-permeable film and an oxygen-impermeable film and providing an evacuation port which allows for the control of gasses within the container.

Due to the irregular shapes of cut meats, the container must be structured so as to best eliminate puncturing of the food package. A specially designed meat package container is disclosed within U.S. Pat. No. 4,136,203, issued Jan. 23, 1979, to Murphy et al. incorporated herein by reference to disclose the construction of such packages. The Murphy et al. patent discloses placing the meat on a layer of foamed material and an oxygen impermeable surface. The meat is wrapped with a film so as to decrease the probability that punctures will be caused by the sharp edges of the meat.

Some of the problems with preserving foods can be alleviated by the use of refrigeration. However, some foods, such as tomatoes, are very sensitive to low temperatures and are physiologically injured if they are exposed to temperatures below 55° F. The injury manifests itself in loss of flavor, a breakdown of cellular structure and, in later stages, rotting of the fruit. Attempts at maintaining the freshness of tomatoes without the use of refrigeration are disclosed within U.S. Pat. No. 4,079,152, issued Mar. 14, 1978, to Bedrosian et al. This patent discloses a gas-permeable film which allows the tomatoes to convert the package atmosphere to an environment containing a specific percentage of carbon dioxide and oxygen. The package contains chemical agents capable of absorbing moisture and carbon dioxide from the environment, which aid in preventing mold and deterioration of the tomatoes.

Another means of controlling the atmosphere within a food package is disclosed within U.S. Pat. No. 4,883,674, issued Nov. 28, 1989, to Fan. This patent discloses a package which includes a gas-permeable portion which allows a specific amount of oxygen into the package per unit of time. The method includes controlling the initial atmosphere within the package.

A number of different variations on airpermeable containers with and without the use of other chemicals which control the absorption of gases are disclosed within U.S. Pat. No. 3,706,410, issued Dec. 19, 1972, to Baker; U.S. Pat. No. 4,322,465, issued Mar. 30, 1982, to Webster; U.S. Pat. No. 4,657,610, issued Apr. 14, -1987, to Komatsu et al.; U.S. Pat. No. 4,856,650, issued Apr. 15, 1989, to Inoue.

Regardless of the type of package used and the gas-permeability of the material, the environment within the package changes due to chemical and biochemical reactions occurring within and around the food product present in the package. Accordingly, a number of oxygen scavenger compounds have been developed for use in connection with these packages. Examples of oxygen scavengers are disclosed within U.S. Pat. No. 4,299,719, issued Nov. 10, 1981, to Oaki et al.; U.S. Pat. No. 4,485,133, issued Nov. 27, 1984, to Ohtsuka et al.; and U.S. Pat. No. 4,536,409 to Farrell et al.

Each of the containers, materials and systems discussed above have advantages and disadvantages. When used in connection with certain foods, each can aid in preserving the color, quality and/or shelf life of a particular type of food product. However, they are generally limited to particular types of products, particular temperatures, and are more useful at certain points in the preservation of the food than at other points in time. As an example of the limitations of such packagings, it is pointed out that when food, such as plant tissue is sealed in a container, it tends to deteriorate due to the contact of the tissue with moisture condensed on the interior walls of the package container. This is especially troublesome in connection with plastic films and other relatively solid, moisture- and gas-impermeable materials, whether transparent or opaque. If the plant tissue is wrapped in close proximity or in contact with the interior wall of the wrapping material, the moisture comes in contact with the product and accelerates deterioration, and thus reduces the quality of the food product present in the package.

An elaborate method to aid in eliminating moisture buildup within the package is disclosed within U.S. Pat. No. 4,759,444, issued Jul. 26, 1988, to Barmore. This method uses gas-permeable surfaces and flushes certain gasses from the enclosure prior to sealing the package. However, the package is not a dynamic system. It is clear that, in order to provide a food package which aids in maintaining the color, quality and shelf-life of the food, the package must be somewhat dynamic. More specifically, as recognized by Theodore S. Lioutas in an article published in September 1988 in "Food Technology," there is a need for the development of "smart film" that could actually "sense" changes and adjust their permeability over a temperature range. The present invention provides for a food package which meets those needs by use of a polymer with a thermally responsive permeability.

SUMMARY OF THE INVENTION

The present invention provides packages for foods and other such biological materials which are no longer growing but rather deteriorating, which packages are comprised of "intelligent" polymers, i.e., polymers which are formulated so that they will have permeabilities which change in either direction with temperature. Using the package, the color, quality and/or shelf-life of the deteriorating biological material may be preserved for extended periods of time. The polymers are specifically designed to have variable gas permeabilities, which permeabilities can be changed radically and reversibly by relatively small changes in temperature. Accordingly, the package provides an environment which adjusts to the respiration of the particular food and which package can be changed gradually, slightly or dramatically by change in temperature.

The polymers used in making the packages of the invention are crystalline polymers such as side-chain crystallizable polymers which are designed and formulated so as to provide for the dynamic environmental packages of the invention. Depending on the exact nature of the crystallizable polymer, its permeability can change relatively gradually or relatively rapidly in the region of he first order transition point of the polymer. For example, the polymers can be designed to be relatively impermeable to one or more gases at a given temperature and then become substantially permeable to one or more gasses above a given transition point temperature. The polymers can undergo one or more phase changes.

A primary object of the present invention is to provide a food package comprised of materials which change permeability with changes in temperatures in order to match the respiration of the food in the container.

Another object of the present invention is to provide a food container comprised of a side-chain crystallizable polymer, which polymer has a gas (e.g., $O_2$ and $CO_2$) permeability which increases by a factor of greater than 2.5 in response to a 10 centigrade degree temperature increase (in the range of 0° C. to 40° C.).

An advantage of the present invention is that the container is capable of preserving the color, quality, and/or shelf life of the biological material present in the container.

A feature of the present invention is that the crystalline polymers such as side-chain crystallizable polymers can be constructed and formulated so as to produce temperature responsive, gas permeable packages which are particularly adapted for containing particular types of foods and other such materials, and whose permeability can be changed by changing the temperature at which the package is held.

Another feature of the present invention is that crystalline polymers such as side-chain crystallizable polymers can be designed so as to specifically regulate their permeability with respect to oxygen and/or carbon dioxide and can be designed such that permeability can be precisely adjusted by changing the temperature at which the package is held.

Another object is to provide packaging comprised of polymers having gas permeability properties whose temperature coefficients closely mimic various biological materials such as foods so as to allow gases to enter or escape from the package at a rate closely matched to the rate which the gases are being consumed or evolved from the biological material.

Another object of the present invention is to provide a rational systematic methodology for developing packaging materials comprised of polymers having tailored temperature dependent permeation properties which polymers may be statistical mixtures of polymeric materials of a single type or mixtures of various types of polymeric materials with the materials being combined so as to obtain various desired results regarding permeability and changes in that permeability based on temperature.

A feature of the present invention is that the polymeric materials used in forming the packages can be applied directly to the biological materials being packaged in order to act as a second skin for the biological materials, thereby modifying the respiration properties of the materials.

It is yet another object of the present invention to provide a food product which has the crystalline polymer of the invention coated directly thereon.

Another object of the invention is to provide a method for coating crystalline polymers of the invention directly onto a food product such as by emulsifying the crystalline polymers in water and then dipping the food into the water or spraying the polymers in an aerosol form directly onto the food product and thereby limiting the transport of gas into and out of a food product, such as an apple in order to slow its metabolism.

Another feature of the present invention is that by directly coating a food product, the polymers of the invention can regulate the internal atmosphere of the food product and thereby increase the shelf life of the food product.

These and other objects, advantages, and features of the present invention will become apparent to those persons skilled in the art upon reading the details of the structure, formulation and usage as more fully set forth below.

DETAILED DESCRIPTION OF PREFERRED EMBODIMENTS

Before the present food package and side-chain crystallizable polymers used in making the package are described, it is to be understood that this invention is not limited to the particular packages, polymers or polymer formulations described as such may, of course, vary. It is also to be understood that the terminology used herein is for the purpose of describing particular embodiments only, and is not intended to be limiting since the scope of the present invention will be limited only by the appended claims.

It must be noted that, as used in this specification and the appended claims, the singular forms "a," "an," and "the" include plural referents unless the context clearly dictates otherwise. Thus, for example, reference to "a side-chain crystallizable polymer" includes statistical mixtures of such polymers, reference to "an antioxidant" includes reference to one or more of such antioxidants, and reference to "the food package construction" includes a plurality of such constructions of the type described herein, and so forth.

The containers produced in accordance with the present invention can be used for packaging and preserving all types of dynamic biological materials such as foods and cut flowers. The packages are comprised of intelligent polymers formed into containers which have specific and variable gas permeabilities. The polymers are "intelligent" in that they have permeabilities which are and reversibly changed by temperature changes. By using different types of polymer and/or mixtures of polymers and various temperatures it is possible to create an environment which adjusts to the respiration of the food in the container. Accordingly, the containers are designed to best preserve the color, quality and/or shelf life of the food. The polymers which are temperature responsive are comprised of crystalline polymers, preferably side-chain crystallizable polymers, which are designed and formulated so as to provide a material which is dynamic in nature, that is, changing depending upon the temperature to which it is exposed. The polymeric materials can be designed so that they are substantially impermeable to a given gas such as oxygen at a temperature substantially below the first order transition point and highly permeable to the same gas at a temperature closer to or above the transition temperature.

Accordingly, an essential feature of the present invention is using crystalline polymers such as side-chain crystallizable polymers as diffusion barriers which are temperature responsive and variable. These crystalline polymers are distinct from other polymers in that when they are formed into a sheet the sheet will possess a characteristic of having a significant variability in permeability as a function of temperature. These temperature-dependent permeation characteristics make it possible for the packages of the present invention to provide temperature-sensitive gas permeability which can be turned "on" and "off" by temperature variation or, by the use of temperature variation can adjust the rate of gas permeability.

A particular type of side-chain crystallizable polymers, i.e., cross-linked side-chain crystallizable polymers, are described within the "Journal of Polymer Science": Macromolecule Reviews (1974) 8:117 and "Journal of Polymer Science": Polymer Chemistry Addition (1981) 19:1871–1873. Side-chain crystallizable polymers are sometimes referred to as "comb-like" polymers and are available commercially. These polymers are generally reviewed in the "Macromolecular Review" article referred to above. However, the use of such polymers in connection with the production of food packages is not heretofore known.

The packages of the present invention are comprised of polymers which can be formed into structural components which provide reversible, gas permeability changes which are temperature dependent. The structural components maintain their integrity within the temperature ranges and can be formulated so as to provide sufficient structural integrity to enclose and adequately protect the food product. The crystalline polymers are preferably side-chain crystallizable polymers which are chosen and designed so that they: (1) can form components which retain their shape and structure and do not freely flow within temperature ranges which the packages are normally subjected to; (2) exhibit one or more phase transitions at phase transition temperature points; (3) have substantially greater permeability to a gas or gasses at temperatures equal to or greater than a selected temperature than at temperatures below the selected temperature; and (4) are structurally positioned so as to regulate gas flow between an outside environment and the internal package environment which holds the food whereby the rate of gas flow between the outside environment and the internal package environment can be regulated by changing the temperature and thereby changing the permeability of the material with respect to gases in both environments.

In general, the crystalline polymers of the invention have a first order melting transition in the range of $-10°$ C. to $40°$ C. and more preferably in the range of from about $0°$ C. to about $35°$ C. Preferably the polymers exhibit a heat of fusion of greater than 20 J/g in the temperature range of interest. The polymers may be homopolymers, random, block, graft, alternate or similar co-polymers. In addition, the crystalline polymers of the invention may be combined with other polymers to form various blends and laminates which can be used in producing the packages of the invention.

The crystalline polymers of the invention are generally formed into films which have a permeability with respect to oxygen of greater than about 1000 ml.mil/($m^2$.day.atm) at $25°$ C. Materials with significantly lower permeability (e.g., one-half or less the permeability) require too much surface area to be generally useful in most packaging applications which require active gas exchange. Preferably the polymers are bondable or heat sealable. The crystalline polymers may be cross-linked and oriented or expanded to render them heat-shrinkable by using methodologies generally known to those skilled in the art.

A variety of structural configurations can be used to produce the package components of the present invention. Perhaps the simplest and easiest to produce is to make the side-chain crystallizable polymers in the form of a flexible sheet of material. The sheet material is then simply wrapped around a dynamic biological material such as a food product in the same way conventional polymeric transparent food wrap materials are used. Other embodiments of the package can be conceived. In general, it is important to construct the package so that the inside environment of the package is completely separated (i.e., airtight other than permitted by material permeability) with respect to the outside environment. Some possible structural configurations are as follows:

(1) sheets of material which can be wrapped around the biological material being packaged;

(2) walled structures in the form of cubes and/or rectangular blocks comprised completely of the crystalline material or comprised in part of other materials having one or more windows of crystalline material thereon; and (3) bags which are comprised completely of the crystalline polymers of the invention and/or which are comprised of other polymeric materials and have windows, patches or areas thereon which are comprised of the crystalline material of the invention. Numerous variations of these structures are also possible and such structures will become apparent to those skilled in the art upon reading this disclosure.

The side-chain crystallizable polymers for use in the present invention have the following general structural formula:

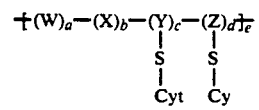

wherein W and X are each respectively a first and a second monomer unit, which monomer unit may be any molecular moiety connectable to an adjoining molecular moiety (i.e., polymerizable), Y and Z are each independently a backbone monomer unit which may be any molecular moiety or atom, each S is independently a linking group or spacer unit and is optionally present, Cyt and Cy are each independently a crystallizable moiety connected to the respective backbone directly or via the spacer unit, and a, b, c, d and e are each, independently, integers ranging from 0–1,000 with the proviso that sufficient Cyt and Cy are present so as to provide a Mw which is equal to or greater than twice the sum of the Mws of W, X, Y and Z, and further wherein the polymers have a heat of fusion ($\Delta Hf$) of at least five joules/gram, and preferably about ten joules/gram. It is understood that when the variables a, b, c and d are greater than 1, the monomer units W, X, Y and Z can be repeating units or mixtures of different monomer. Units, for example, a mixture of styrene, vinyl acetate, acrylic acid, methyl styrene and hexadecyl acrylate in ratios of 5:5:2:5:83. Thus, any of the monomer units W, X, Y and Z can be mixtures of polymerizable monomers. The resulting polymer must be crystallizable and is preferable side-chain crystallizable, and more preferably, possesses the characteristics indicated in this disclosure.

The crystalline polymers of the invention preferably have a Mw greater than 250,000 and are optionally cross-linked. There are a number of factors which affect the permeability of the polymer. For example, when the polymer has the above general structural formula and side chain Cy and/or Cyt are/is a simple aliphatic hydrocarbon, the longer the carbon chain, the higher the melting point and the greater the permeability changes the polymer will undergo. Use of very regular polymers (e.g. polymers having a large percentage of 14 C chains) give rise to polymers with sharp permeability changes whereas polymers with less regular structure (mixtures of various carbon chain links) give rise to broad permeability ranges. Narrow or broad permeability ranges may be desirable depending upon the particular biological material being packaged. In general, as "a" and "b" increase (other factors being held constant), the permeability change will become smaller.

The backbone of the polymer (defined by W, X, Y and Z) may be any organic structure (aliphatic or aromatic hydrocarbon, ester, ether, amide, etc.) or an inorganic structure (sulfide, phosphazine, silicone, etc.). The spacer linkages can be any suitable organic or inorganic unit, for example ester, amide hydrocarbon, phenyl, ether, or ionic salt (for example a carboxylalkyl ammonium or sulfonium or phosphonium ion pair or other known ionic salt pair). pair. The side-chain (defined by Cyt and Cy and an optionally present S) may be aliphatic or aromatic or a combination of aliphatic side-chains of at least 10 carbon atoms, fluorinated aliphatic side-chains of at least 6 carbons, and p-alkyl styrene side-chains wherein the alkyl is of 8 to 24 carbon atoms.

The length of each side-chain moiety is usually greater than 5 times the distance between side-chains in the case of acrylates, methacrylates, vinyl esters, acrylamides, methacrylamides, vinyl ethers and alpha olefins. In the extreme case of a fluoroacrylate alternate copolymer with butadiene, a side chain can be as little as 2 times the length of the distance between branches. In any case, the side-chain units should make up greater than 50% of the volume of the polymer, preferably greater than 65% of the volume. Co-monomers added to a side-chain polymer usually have an adverse effect on crystallinity. Small amounts of various co-monomers can be tolerated, usually up to 10 to 25 volume percent. In some cases it is desirable to add a small amount of co-monomers, for example cure site monomers such as acrylic acid, glycidal methacrylate, maleic anhydride, amino functional monomer and the like.

Specific examples of side-chain crystallizable monomers are the acrylate, fluoroacrylate, methacrylate and vinyl ester polymers described in J. Poly. Sci. (1972) 10:3347; J. Poly. Sci. (1972) 10:1657; J. Poly. Sci. (1971) 9:3367; J. Poly. Sci. (971) 9:3349; J. Poly. Sci. (1971) 9:1835; J.A.C.S. (1954) 76:6280; J. Poly. Sci. (1969) 7:3053; Polymer J. (1985) 17:991, corresponding acrylamides, substituted acrylamide and maleimide polymers (J. Poly. Sci., Poly. Physics Ed. (1980) 18:2197; polyalphaolefin polymers such as those described in J. Poly. Sci.: Macromol. Rev. (1974) 8:1–117–252, and Macromolecules (1980) 13:12, polyalkylvinylethers, polyalkylethylene oxides such as those described in Macromolecules (1980) 13:15, alkyphosphazene polymers, polyamino acids such as those described in Poly. Sci. USSR (1979) 21:241, Macromolecules (985) 18:2141, polyisocyanates such as those described in Macromolecules (1979) 12:94, polyurethanes made by reacting amine- or alcohol-containing monomers with long-chain alkyl isocyanates, polyesters and polyethers, polysiloxanes and polysilanes such as those decried in Macromolecules (1986) 19:611 and p-alkylstyrene polymers such as those described in J.A.C.S. (1953) 75:3326 and J. Poly. Sci. (1962) 60:19.

The main properties of the side-chain crystallizable polymer that are believed to affect its permeability properties are: melting point, glass transition, crystallinity, crosslink density, and sidechain structure. Melting point will be chosen to correlate to the temperature at which a particular gas permeability is desired. For instance, if one desires the food package to have increased gas permeability at 25° C. or above, a side-chain crystallizable polymer having a melting point of approximately 25° C. is chosen. The percent crystallinity of the polymer (below its melt point) will typically be in the range of 10% to 55%, more usually 15% to 50%. In general, the higher the crystallinity, the greater the change in permeability exhibited at phase transition. As indicated below, the crosslink density will typically be greater than about 0.1 to 1. Crosslinking in general decreases permeability at melt. At such crosslink densities, however, the decrease is not sufficient enough to render the permeability of the polymer substantially insensitive to temperature but is sufficient to significantly reduce the fluidity of the polymer at temperatures above the melt temperature. As indicated above, the chemical structure of the polymer may vary widely. The permeability of the polymer will typically be substantially greater, e.g., at least threefold and more usually at least fivefold higher at or above its melting point than at temperatures below its melting point.

For use as a temperature corrective membrane in accordance with the invention, the side-chain crystallizable polymer is in a form in which it retains its shape and is not free to flow at its melting temperature (i.e., the temperature/temperature range at/over which the side chains undergo a phase change from crystalline to amorphous). Otherwise, the polymer would not remain in its intended location (interposed between the food and the outside environment) and would be displaced or dispersed elsewhere due to gravitational or other forces. In this regard, in many embodiments the side-chain crystallizable polymer interfaces directly with the environment (its surface contacts the environment) and would be free at its melt temperature to disperse into the environment.

In one such form, the side-chain crystallizable polymer is crosslinked to a degree such that it becomes viscoelastic at its "melt" temperature but is not so fluid that it readily flows in response to mild forces. Accordingly, the term "crosslinked side-chain crystallizable polymer" is used to describe side-chain crystallizable polymers which are resistant to flow above their side-chain melting points. Resistance to flow is obtained by providing sufficient crosslinking density that the material has an elastic modulus above the melting point of the side chains. Generally, crosslink density in these materials is described as the number of crosslinks per weight average molecular weight. For example, a polymer having an average molecular weight of 125,000 and having an average of 1 intermolecular crosslink per polymer chain is stated to have a crosslink density of 1. In order for a side-chain crystallizable polymer to resist flow above the melt it is desirable to have a crosslink density greater than about 0.1, preferably greater than 0.5, and most preferably greater than 1. It is not necessary for all of the polymer chains in a material to be crosslinked and a high gel content is not generally necessary unless the application requires great solvent resistance. Generally crosslinking beyond about 10 mole percent is not necessary under normal circumstances and excessive crosslinking can result in decreased crystallinity and impaired performance. In terms of mole percent the crosslinking will normally be in the range of 0.01 percent to 10 mole percent. The crosslinked polymers will normally have a heat of fusion of at least about 5 joules/gram, preferably about 10 joules/gram and more preferably about 20 joules/gram.

A variety of methods are available to produce crosslinked side-chain crystallizable materials. A network copolymer can be prepared by polymerizing a side-chain crystallizable monomer and a multifunctional monomer either in one or two steps. A one step process may be used to form a membrane in place, while a two step process is useful where an intermediate processing step is necessary. A variety of multifunctional monomers (di, tri or multifunctional acrylic or methacrylic esters, vinyl ethers, esters or amides, isocyanates, aldehydes, epoxies and the like) are known in the art. These multifunctional monomers can be used on a one or two step process depending on the desired result. Ionizing radiation, for example beta or gamma radiation, peroxides, silanes or similar cure agents, can be used to crosslink a preformed side-chain crystallizable polymer with or without added co-monomers. Ionic crosslinks can be formed by, for example, reacting an acidic polymer site with a di- or trivalent metal salt or oxide to produce a complex which serves as a crosslink site. Likewise, organic salts or complexes can be prepared by methods known in the art.

Effective crosslinking may also be obtained by physical methods. For example, a block copolymer of a side-chain crystallizable polymer and a second polymer which exhibits a glass transition or melting point higher than the side-chain crystallizable polymer may be prepared wherein the entire mass exhibits mechanical stability above the melting point of the side-chain crystallizable polymer but below the transition of the second polymer.

In another form, the crystalline polymer is placed within a support such as a microporous membrane, hollow fiber or fabric mesh. In such embodiments, the polymer is immobilized by physical entrapment, surface tension, and/or other physical forces. The crystalline polymer fills the pores of the membrane or holes in the mesh, thus providing numerous continuous pathways of side-chain crystallizable polymer through the membrane/mesh. The polymer may be placed in the pores/holes by soaking the membrane/mesh in a polymer solution or melt or forcing the polymer solution or melt into the pores/holes under pressure. The membrane/mesh material may be permeable to the various gases or impermeable. If it is permeable to the gases, gases will permeate through it to the outside environment at a given rate at temperatures below the melt temperature of the side-chain crystallizable polymer. At or above the melt temperature, the gases will permeate through both the membrane/mesh material and side-chain crystallizable polymer filling the pores, thus providing a higher rate of gas release per unit of surface area. If the membrane/mesh material is impermeable to the gases, gases will not permeate through the membrane below the melt temperature of the side-chain crystallizable polymer. At or above that temperature, the gases will permeate through the membrane via the continuous pathways of side-chain crystallizable polymer.

Polymers are statistical mixtures of units all of which vary, one from another, over a range. Accordingly, properties such as melting point, glass transition temperature, permeability changes and the like do not generally take place at a given point but rather over a range. The polymers used to make the packaging of the invention are designed such that the temperature range where the rate of change is greatest corresponds to the desired permeability change point as closely as possible.

Polymers used in making the packages of the invention have a first-order transition temperature or melting point in the range of approximately 0° C. to 40° C. By the terms "melting point" or "first order transition" as used herein is meant the temperature at which an equilibrium process causes certain portions of the polymer, initially aligned in an ordered array, to become disordered. By the term "freezing point," is meant the temperature at which an equilibrium process causes those certain portions of the polymer, initially disordered, to become aligned in an ordered array. Preferably, the first-order transition temperature or melting point will be in the range of about 0° C. to 40° C., more preferably in the range of about 10° C. to 25° C. Depending on the type of product being preserved and the results desired, a sharp or gradual melting may be preferred. If rapid melting is preferred, the melting should occur over a relatively narrow temperature range, less than about 10 centigrade degrees, preferably less than about 5 centigrade degrees.

The melting behavior of the crystalline polymers used in this invention is determined by means of a differential scanning calorimeter (DSC) at a heating rate of 10° C. per minute. The onset of melting is designated $T_o$, the crystalline melting point (i.e. the peak of the DSC curve) is designated $T_m$, and the completion of melting (i.e. the end of the DSC peak) is designated $T_f$. The heat of fusion is the heat absorbed by the melting of the polymer between $T_o$ and $T_f$. The value of $T_f$-$T_o$, i.e. the temperature range over which melting takes place, can be more or less than 10° C. Generally, the permeability begins to increase in the region of $T_o$ and continues to increase up to and beyond $T_m$.

The membrane or mesh may inherently be made of an electrically conductive material or be coated or contain particles of such material (e.g., carbon, iron, nickel, copper, aluminum) by which the membrane/mesh may be heated by conduction or induction to cause the crystalline polymer material to undergo the desired phase change. When the diffusion matrix is intended to be heated by radiation, materials that enhance radiation adsorption may be incorporated into the matrix.

It is also possible to disperse (blend homogeneously) a crystalline polymer at high volume loadings (e.g., greater than 20%, usually 50% to 90%) in a continuous or cocontinuous phase matrix material that is either permeable or impermeable to the gases. At such high volumes, there are sufficient amounts of the dispersed side-chain crystallizable polymer to form continuous paths of side-chain crystallizable polymer through the matrix. In effect, then, such dispersions function similarly to the embodiments in which the crystalline polymer is suspended within a porous network or mesh. In this regard, it is necessary that the crystalline polymer be a continuous phase if the second polymer is impermeable to the gases, and may be dispersed in the second polymer if the second polymer is essentially permeable to the gases.

In a similar manner, a crystalline polymer may be immobilized by creating a second polymer within or throughout the crystalline polymer by polymerization and phase separation. For example, a noncrosslinked side-chain crystallizable polymer may be heated above its melting point with a second monomer or monomer mixture and the monomer(s) caused to polymerize. In this case a supporting polymer network can be created in situ. In this case it is desirable that the second polymer created be at least partially insoluble in the side-chain crystallizable polymer, yet be of a sufficient structure to bind the side-chain crystallizable polymer into a stable form above its melting point.

In another form, a layer of side-chain crystallizable polymer is chemically bonded (grafted) to the surface of a gas-permeable polymer membrane. In this instance, the chemical bonding immobilizes the side-chain crystallizable polymer and prevents it from migrating out of the path of the agent. The side-chain crystallizable polymer may be grafted to the membrane surface through various functional groups as is known in the art. The particular surface treatments/bonding agents used will vary with the nature of the membrane and the side-chain crystallizable polymer.

The side-chain crystallizable polymer may also be immobilized by laminating it to one or between two gas-permeable polymer membranes that are fused to each other at a plurality of sites so as to prevent relative motion between the membranes when the side-chain crystallizable polymer melts. The fusions may be along continuous lines so as to form a waferlike structure or be at separated points. Depending upon the thickness of the side-chain crystallizable layer in such assemblies, it may be desirable to make such layer out of crosslinked side-chain crystallizable polymer to prevent the side-chain crystallizable polymer from oozing from the edge of the assembly.

EXAMPLES

The following examples are put forth so as to provide those of ordinary skill in the art with a complete disclosure and description of how to make the crystalline polymers and formulate them into compositions for producing the food packages of the present invention and are not intended to limit the scope of what the inventors regard as their invention. Efforts have been made to ensure accuracy with respect to numbers used (e.g., amounts, temperature, etc.) but some experimental errors and variation should be accounted for. Unless indicated otherwise, parts are parts by weight, temperature is in degrees Centigrade, and pressure is at or near atmospheric.

EXAMPLE 1

Preparation of Crystalline Polymer Film A

Cellgard 2400 (Hoechst Celanese) was coated with polymethyltetradecyl siloxane (Petrarch Systems) to yield a 0.001" thick composite film (A). The resultant film showed a DSC peak at 20° C. The transition was attributed to the melting of the siloxane polymer contained in the pores of the Cellgard.

EXAMPLE 2

Preparation of Crystalline Polymer Film B

A side-chain crystallizable polymer was prepared by heating a mixture of 195.4 g hexadecylacrylate, 195.2 g tetradecylacrylate, 10.0 g of acrylic acid and 4.0 grams of azobisisobutyronitrile in 800 ml of toluene at 60° C. for 14 hours. The resultant polymer had a $T_m$ peak 34° C. with a heat of fusion of 60 J/g and had a molecular weight of 147,000 daltons. 50 grams of this resulting polymer, 0.2 g XAMA 2 and 50 ml of toluene were combined and coated onto a 0.006" thick sheet of rice paper and were cured at 70° C. for one hour.

EXAMPLE 3

Preparation of Crystalline Polymer Film C

A side-chain crystallizable polymer melting at 30° C. was prepared by polymerizing pentadecylacrylate in 1:1 heptane:ethylacetate. A solution of this polymer was coated onto a film of Cellgard 2400 and allowed to dry. Excess polymer was removed to yield a smooth 0.0015" thick film.

EXAMPLE 4

Evaluating Film Permeability Characteristics

The $CO_2$ and $O_2$ permeabilities of films "A" and "B" at various temperatures were determined by a counter-diffusion method involving constructing a gas-tight container, filling the container with a mixture of $N_2$, $CO_2$ and $O_2$ with a combined atmospheric pressure of 1, wherein the initial $CO_2$ concentration is higher and the $O_2$ concentration is lower than atmospheric. The influx of $O_2$ and efflux of $CO_2$ into and out of the container is measured via gas chromatography until near equilibrium is attained. Each film was measured in triplicate using a container volume of 1.25 liter and a membrane area of 45.6 cm$^2$. The initial gas concentration was 15% $CO_2$, 3% $O_2$, and 82% $N_2$.

The results obtained are shown below in Table 1. These results show that the gas permeation of films A and B increases dramatically in the vicinity of their melting points. It should be noted, however, that Film B apparently contained pinholes which made a significant contribution to the measured permeabilities. This fact emphasizes the change in permeability which result from changes in the structure of the film in the region of $T_m$, since the permeability provided by the pinholes is substantially independent of temperature.

TABLE 1

Various Gas Permeabilities of Side-Chain Crystalline Polymers at Selected Temperatures

| Temperature (°C.) | Film A Gas Permeability ml · mil/(m$^2$ · day · atm) | | | Film B Gas Permeability ml · mil/(m$^2$ · day · atm) | | |
|---|---|---|---|---|---|---|
| | $CO_2$ | $O_2$ | $CO_2/O_2$ | $CO_2$ | $O_2$ | $CO_2/O_2$ |
| 1.7 | 15,470 | 4,160 | 3.8 | 51,240 | 57,859 | 0.9 |
| 8.9 | 32,621 | 9,312 | 3.5 | 55,207 | 60,604 | 0.9 |
| 12 | 78,399 | 21,267 | 3.7 | — | — | — |
| 15 | 156,597 | 37,867 | 4.1 | — | — | — |
| 17.8 | 257,424 | 66,384 | 3.9 | 59,921 | 63,823 | 0.9 |
| 24 | 345,435 | 76,096 | 4.5 | 72,658 | 66,131 | 1.1 |
| 35 | — | — | — | 193,352 | 131,352 | 1.5 |

EXAMPLE 5

The moisture permeability of film "C" was measured at various temperatures above and below the melting point using a moisture vapor permeability cup (ASTM E-96-80). Results are given in Table 2.

TABLE 2

| (°C.) | Film C Moisture Vapor Permeability ($\times 10^{14}$ g/Pa · s · m) |
|---|---|
| 10 | 2.8 |
| 20 | 12.1 |
| 30 | 58.6 |
| 37 | 92.3 |

Based on the results shown in Table 2, it can be determined that materials such as the film "C" exhibit much greater temperature-induced moisture vapor permeability increases than commercially available food packaging.

EXAMPLE 6

Food Package Comprised of Side-Chain Crystallizable Polymers

Two 500 ml glass jars were filled ⅔ with button mushrooms. One jar was sealed with commercial saran film having a surface area of 28 cm². The second jar was sealed with a film of A having a surface area of 28 cm².

Both jars were placed at approximately 5° C. for 24 hours and then placed at approximately 22° C. and observed daily. After a total of three days, the mushrooms in the saran container were predominately brown and showed some spots of decomposition. The mushrooms in the side-chain crystallizable polymer jar showed only slight discoloration. This was attributed to the greater permeability and presumably a lower $CO_2$ content in the jar. After seven days, the saran covered mushrooms were very brown and showed a great accumulation of moisture whereas the side-chain crystallizable polymer covered mushrooms were only slightly discolored and only modest amounts of moisture had accumulated inside the container.

EXAMPLE 7

The design of a successful modified atmosphere food package requires that gas exchange membranes be selected (alone or in combination) such that suitable gas concentrations are maintained over a suitable range of temperatures. Attention must be given to matching the respiration rate, oxygen requirements and carbon dioxide tolerance of the produce over the anticipated temperature range. Table 3 lists the permeation properties of selected films.

TABLE 3

Permeability of Some Plastic Films to $CO_2$ and $O_2$ (ml · mil/(m² · day · atm) of Some Plastic Films at 0° C.

| Film | $CO_2$ | $O_2$ | $CO_2/O_2$ |
|---|---|---|---|
| LDPE | 15,500 | 2,190 | 7.1 |
| PVC-VF | 10,740 | 3,180 | 3.4 |
| Ethyl cellulose | 87,400 | 33,400 | 2.6 |
| Natural rubber | 135,815 | 18,913 | 7.2 |
| Polybutadiene | 162,000 | 16,700 | 9.7 |
| Poly (butadiene-styrene) | 134,000 | 14,500 | 9.2 |
| Marcellin Membrane | 233,107 | 1,707,264 | 7.3 |
| Film A (1.7° C.) | 15,740 | 4,160 | 3.8 |

The sensitivity of a foods respiration rates or a films permeability to changes in temperature can be characterized by a Q10 value. A film which doubles its permeability in response to a 10 Centigrade degrees temperature increase has a Q10 value of 2 and so forth. The Q10 values of various polymers which are not suitable for use in the invention are given in Table 4.

TABLE 4

Variation of Permeability of Plastic Films to $CO_2$ and $O_2$ for a 10 Centigrade Degree Increase in Temperature ($Q_{10}$)

| Film | $CO_2$ | $O_2$ |
|---|---|---|
| Polyethylene, low density (0.922 g/ml) | 1.70 | 1.95 |
| PVC-VF | 1.67 | 1.90 |
| Ethyl cellulose | 1.09 | 1.30 |
| Natural rubber | 1.49 | 1.63 |
| Polybutadiene | 1.40 | 1.59 |
| Poly (butadiene-styrene) | 1.45 | 1.61 |
| Marcellin Membrane | 1.00 | 1.14 |

The film permeability required regarding certain foods is given in Table 5 and the Q10 values for those foods are given in Table 6.

TABLE 5

Film permeability Required ml · mil/(m² · day · atm) to Achieve Optimal Gas Concentration at 0° C. for Some Fruits and Vegetables Packed in Common Retail Packages or Containers

| Commodity | Respiration Rate | Weight (kg) | Film Area for Gas Exchange (cm²) | $CO^2$ | $O_2$ | Required $CO_2/O_2$ |
|---|---|---|---|---|---|---|
| Apple | low | 2.27 | 1316 | 7,660 | 1,030 | 7.4 |
| Cauliflower | moderate | 0.7 | 665.3 | 9,410 | 5,050 | 5.6 |
| Broccoli | high | 0.6 | 964.9 | 21,800 | 9,680 | 2.2 |
| Strawberry | high | 0.5 | 138.5 | 63,200 | 57,700 | 1.1 |
| Mushroom | very high | 0.2 | 84.1 | 748,000 | 112,000 | 6.7 |

TABLE 6

Variation of Respiration Rates of Some Fruits and Vegetables for a 10° C. Increase ($Q_{10}$) in Air

| Commodity | $Q_{10}$ Value |
|---|---|
| Apple | 2.78 |
| Cauliflower | 2.44 |
| Broccoli | 2.39 |
| Strawberry | 3.01 |
| Mushroom | 2.79 |

To design an optimum package, one would attempt to match the film permeation characteristics to the properties of the fruit or vegetable. A package intended to contain strawberries would utilize a polymer with a higher Q10 than would be needed for broccoli. Q10 values for many fruits and vegetables have been measured under conditions of modified atmospheres and those values are preferable to values measured in air as the latter can vary significantly.

It can be seen that film A can be advantageously used to prevent the development of anoxic conditions due to its high Q10 value. By using film A in conjunction with other polymers of lower Q10 values (e.g., polyethylene), various Q10 values can be obtained in any given package construction. Likewise, it is possible to obtain various CO2/O2 selectivities by combining varying surface areas of film B with, for example, polyethylene.

Tables 7 and 8 below show results which may be obtained using containers comprising Film A or a food packaging film which is commercially available under the trade name Cryovac SSD310 on the storage of broccoli at different temperatures. If the commercial polymer was used as a gas exchange port, it would not be possible to maintain optimum conditions at both 0° C., and, for example, 20° C. Use of film A either alone, or in conjunction with another film would allow a package which prevented the development of anoxic conditions at elevated temperatures.

The film permeation requirements of a package can be estimated by application of an equation as follows:

$$\frac{PO_2 \cdot A}{L} = \frac{RO_2 \cdot W}{([O_2]_{ATM} - [O_2]_{PKG})}$$

(see, for example, Cameron, J., *Food Sci.*, 1989, 54 (6), p. 1413) where $PO_2$ is the oxygen permeability of the film (ml.mil/m².24hrs.atm) at the temperature of interest, A is the film surface area (m²), L is the film thickness (mil), $RO_2$ is the respiration rate (ml/Kg.24hrs) of the produce at the conditions of interest, and W is the weight of produce (Kg) and $(O_2)_{ATM}$ and $(O_2)_{PKG}$ are the concentrations of oxygen outside and inside the package respectively.

A series of eight packages with an initial volume of 473 ml were constructed containing broccoli (cultivar 'Citation') utilizing film A and Cryovac SSD310 as described above.

TABLE 7

| Package | Film Type | Surface Area | Grams of Broccoli |
| --- | --- | --- | --- |
| A | Film A | 30.2 cm² | 100 |
| B | Film A | 30.2 cm² | 7.4 |
| C | SSD310 | 30.2 cm² | 70.1 |
| D | SSD310 | 30.2 cm² | 5.3 |
| E | open to air | | 35 |

The packages were kept at 5° and 20° C. and observations made after various periods of time. The results as given below in Table 8.

TABLE 8

| Package | Temp. (°C.) | Time (days) | Observation |
| --- | --- | --- | --- |
| A | 5 | 1 | Dark green, firm |
| | | 6 | Dark green, firm, moist |
| | 20 | 2 | Dark green, firm |
| | | 4 | Dark green, firm, moist |
| C | 5 | 1 | Dark green, firm |
| | | 6 | Dark green, firm, moist |
| | 20 | 2 | Dark green, firm, wet |
| | | 4 | Beginning to yellow, soft, wet |
| B | 20 | 2 | Dark green, firm |
| | | 4 | Green, purple, yellow, firm |
| D | 20 | 2 | Green, stem browning in spots |
| | | 4 | Green, purple, yellow, soft, stem brown |
| E | 5 | 4 | Dark green, dried out and wilted |
| | | 6 | Purple, yellow green |
| | 20 | 2 | Purple and green |
| | | 4 | Yellow, moldy |

In each case, the produce in the temperature responsive film package was judged to be "Fresher" when stored at 20° C. This is attributed to the higher permeability of the film at that temperature. At the lower temperature, both films provide improved storage relative to the control.

EXAMPLE 8

The following example is put forth to provide a specific example of a non-sidechain crystallizable polymer which can be used to form packages of this invention.

A polymer with oxygen switching properties in the range of 30° C. was prepared by copolymerizing tetrahydrofuran and 2-methyltetrahydrofuran. The resultant linear polymer had a molecular weight of 54,000 and a melting point of 28° C. A film (0.001") thick was laminated onto a microporous polypropylene support. Oxygen permeation was measured at various temperatures as reported in Table 9

TABLE 9

| | Permeation (normal units) | | |
| --- | --- | --- | --- |
| Film # | 5C | 20C | 30C |
| 1 | 3750 | 6730 | 25,800 |
| 2 | 4780 | 7120 | 26,400 |

It was observed that the oxygen permeability increased dramatically at the melting point of the polymer. The melting point (and the resulting permeability change) can be selected by varying the co-polymer composition. A variety of chain extended polyurethanes can be prepared from crystallizable polyethers such as polytetrahydrofuran, polyethylene-oxide, their copolymers and the like. Resistance to flow above the soft segment melting point may be attained by reaction with, for example, di or multifunctional isocyanates.

While the present invention has been described with reference to specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, or biological material (e.g., food) to the objective, spirit and scope of the present invention. All such modifications are intended to be within the scope of the claims appended hereto.

What is claimed is:

1. A package which is surrounded by air and which comprises
   (1) a container which retains its shape at temperatures between 0° C. and 40° C., and
   (2) within the container, a biological material which is actively respiring and which is selected from the group consisting of foods and flowers;
   said container comprising one or more control sections which provide the only way in which oxygen, carbon dioxide and water vapor from the air can enter or leave the container, at least one of said control sections being a first control section
   (a) which is composed of a polymeric material which comprises a crystalline polymer having a first order transition point $T_m$ from 0° C. to 40° C. and a heat of fusion of at least 5 J/g, and
   (b) said polymeric material being sufficiently permeable to oxygen, carbon dioxide and water vapor and the polymeric material exhibiting an increase in permeability to at least one of oxygen and carbon dioxide by a factor of at least 2.5 over a temperature range of 10° C. between 0° C. and 40° C. such that said control sections cause said package to provide an environment around the biological material which adjusts to the respiration of the biological material to extend its shelf-life when the temperature of the container and biological material changes within the temperature range of 0° C. and 40° C.

2. A package according to claim 1 wherein the first control section has, at $T_m$, a permeability to at least one of oxygen and carbon dioxide which is at least 3 times its permeability at 0° C.

3. A package according to claim 2 wherein p is 5.

4. A package according to claim 1 wherein the first control section has a permeability to oxygen at $T_m$ of at least 1,000 ml.mil/m$^2$.day.atm.

5. A package according to claim 1 wherein the first control section has a permeability to oxygen at $T_m$ of at least 5,000 ml.mil/m$^2$.day.atm.

6. A package according to claim 1 wherein the first control section has a permeability to oxygen which is x ml.mil/m$^2$.day.atm at 0° C. and which increases by at least 0.07 × for each 1° C. rise in temperature from 0° C. to 40° C.

7. A package according to claim 1 wherein the first control section has a permeability to water vapor which is y ml.mil/m$^2$.day.atm at 0° C. and which increases by at least 0.07 y for each 10° C. rise in temperature from 0° C. to 40° C.

8. A package according to claim 1 wherein $T_m$ is from 0° C. to 35° C.

9. A package according to claim 1 wherein $T_m$ is from 10° C. to 25° C.

10. A package according to claim 1 wherein the crystalline polymer has a heat of fusion of at least 20 J/g.

11. A package according to claim 1 wherein the crystalline polymer is a side chain crystallizable polymer.

12. A package according to claim 1 wherein the crystalline polymer begins to melt at a temperature $T_o$ ° C. and $T_f - T_o$ is less than 10 ° C., wherein $T_o$ is the onset of melting and $T_f$ is the completion of melting.

13. A package according to claim 1 wherein the crystalline polymer begins to melt at a temperature $T_o$ ° C. and $T_f - T_o$ is 5° C. to 10° C., wherein $T_o$ is the onset of melting and $T_f$ is the completion of melting.

14. A package according to claim 1 wherein the crystalline polymer begins to melt at a temperature $T_o$ ° C. and $T_f - T_o$ is more than 10° C., wherein $T_o$ is the onset of melting and $T_f$ is the completion of melting.

15. A package according to claim 1 wherein the crystalling polymer has been crosslinked.

16. A package according to claim 1 wherein the crystalline polymer is associated with a support which immobilizes the polymer by physical forces at temperatures of $T_m$ and above.

17. A package according to claim 1 wherein the container consists essentially of said polymeric material.

18. A package according to claim 17 wherein the container is a sheet of said polymeric material.

19. A package according to claim 1 wherein the container consists essentially of (i) material which is substantially impermeable to oxygen and carbon dioxide, and (ii) a single first control section.

20. A package according to claim 1 wherein the container consists essentially of (i) material which is substantially impermeable to oxygen and carbon dioxide, (ii) a single first control section, and (iii) at least one second control section composed of a polymer which does not have a crystalline melting point in the range 0° C. to 40° C.

21. A method of storing a biological material which is actively respiring and which is selected from the group consisting of foods and flowers, which method comprises
   (A) placing the biological material inside a container which
      (1) retains its shape at temperatures between 0° C. and 40° C.,
      (2) comprises one or more control sections which provide the only way in which oxygen, carbon dioxide and water vapor can enter or leave the container, at least one of said control sections being a first control section
         (a) which is composed of a polymeric material which comprises a crystalline polymer having a melting point $T_m$ from 0° C. to 40° C. and a heat of fusion of at least 5 J/g, and
         (b) said polymeric material being sufficiently permeable to oxygen, carbon dioxide and water vapor and the polymeric material exhibiting an increase in permeability to at least one of oxygen and carbon dioxide by a factor of at least 2.5 over a temperature range of 10° C. between 0° C. and 40° C. such that said control sections cause said package to provide an environment around the biological material which adjusts to the respiration of the biological material to ex tend its shelf-life when the temperature of the container and biological material changes within the temperature range of 0° C. and 40° C.
   (B) storing the container in air, with the biological material inside it, at a temperature $T_1$ which is at least 0° C. and less than 40° C.; and
   (C) storing the container in air, with the biological material inside it, at a second temperature $T_2$ which is above $T_1$ and at most 40° C. and at which the permeability of the first control section of at least one of oxygen and carbon dioxide is at least 2.5 times the permeability at $T_1$.

22. A method according to claim 21 wherein the container is stored at $T_1$ and then at $T_2$.

23. A method according to claim 21 wherein the container is first stored at $T_2$, then at $T_1$, and then at $T_2$.

* * * * *